Figure 1:
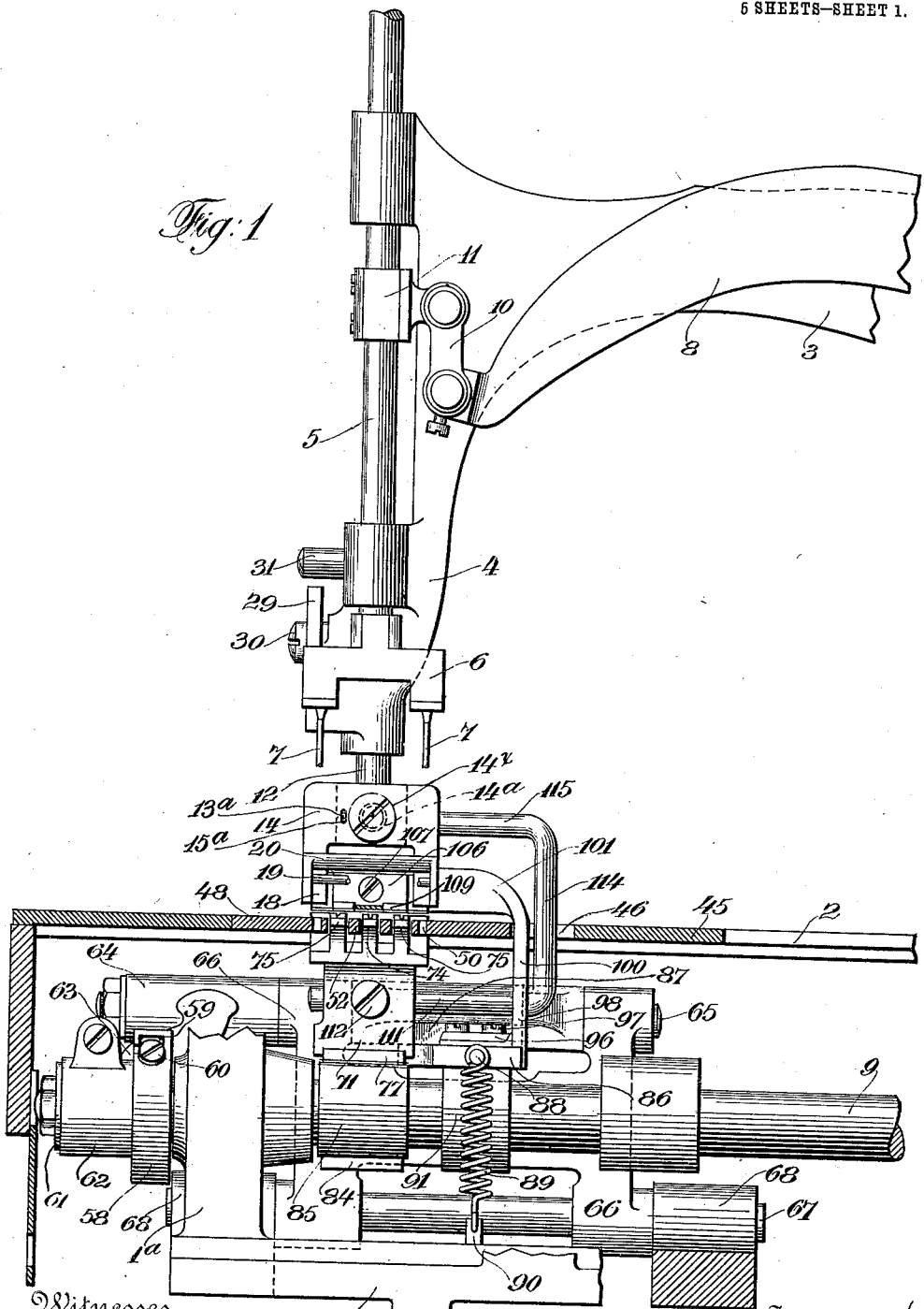

J. J. M. CHAUVET & J. T. DOWDALL.
AUTOMATIC CLAMP FEEDER AND RELEASER.
APPLICATION FILED NOV. 6, 1906.

1,006,827.

Patented Oct. 24, 1911.

5 SHEETS—SHEET 1.

J. J. M. CHAUVET & J. T. DOWDALL.
AUTOMATIC CLAMP FEEDER AND RELEASER.
APPLICATION FILED NOV. 6, 1906.
1,006,827.
Patented Oct. 24, 1911.
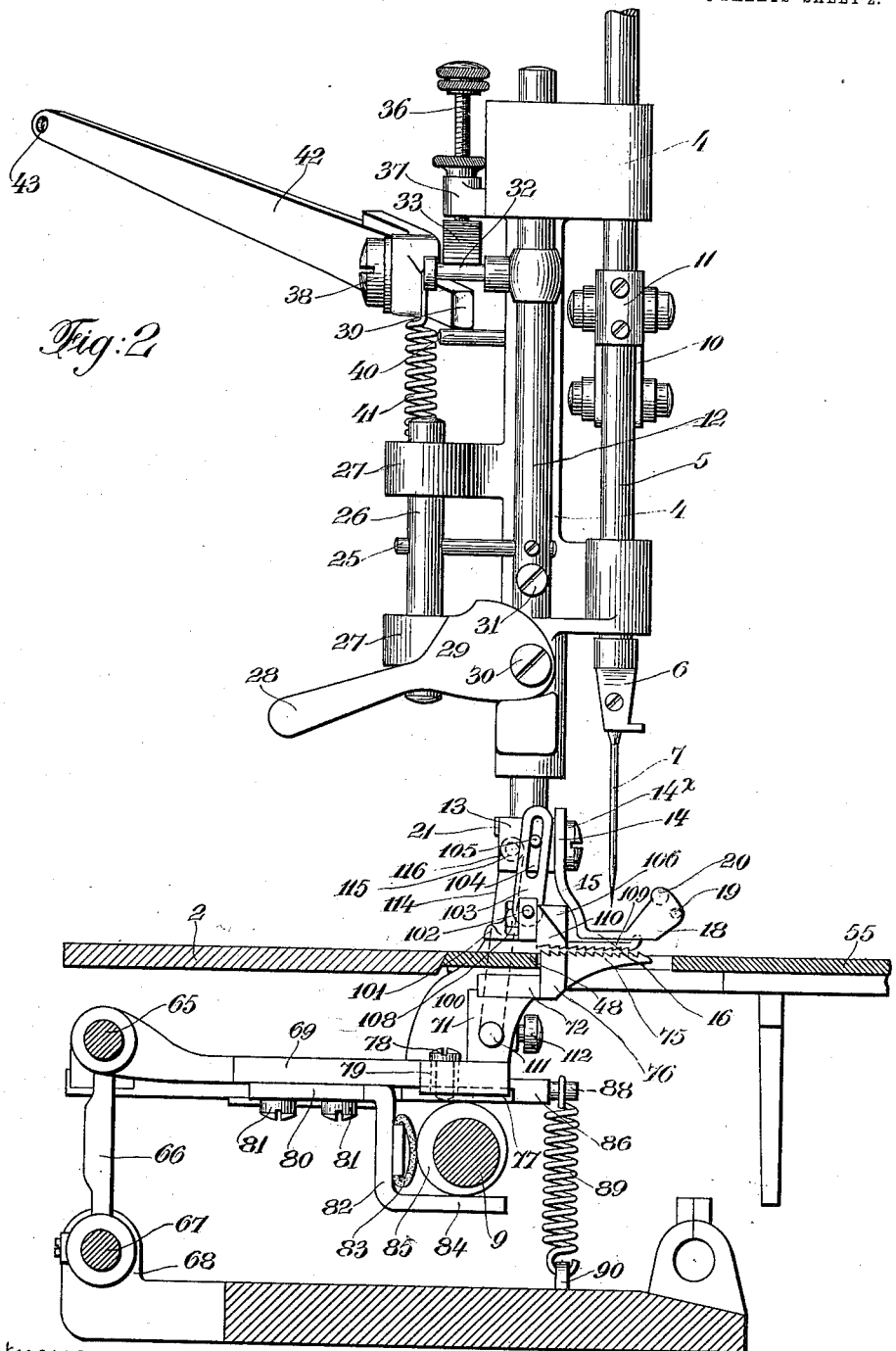
Fig: 2

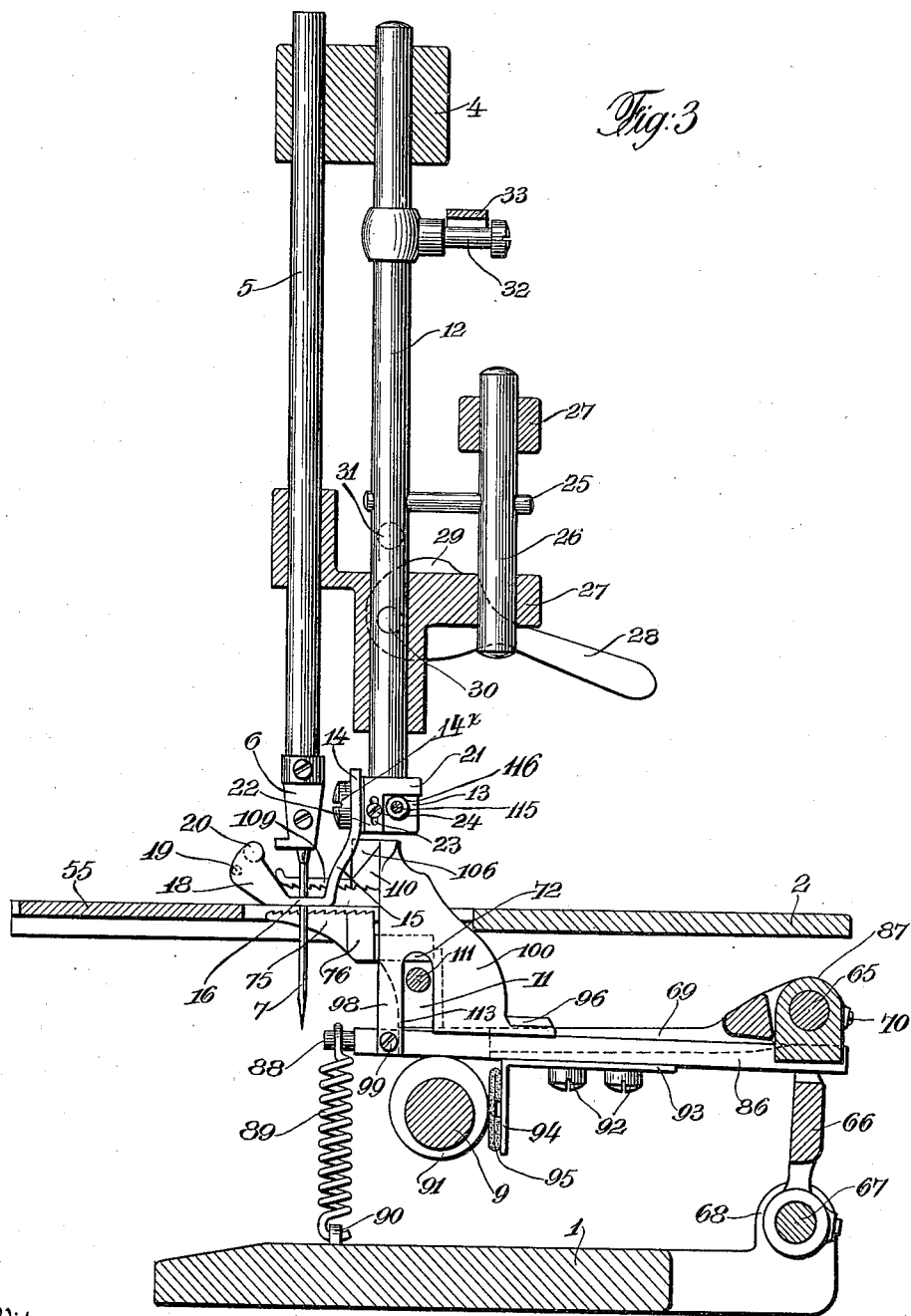

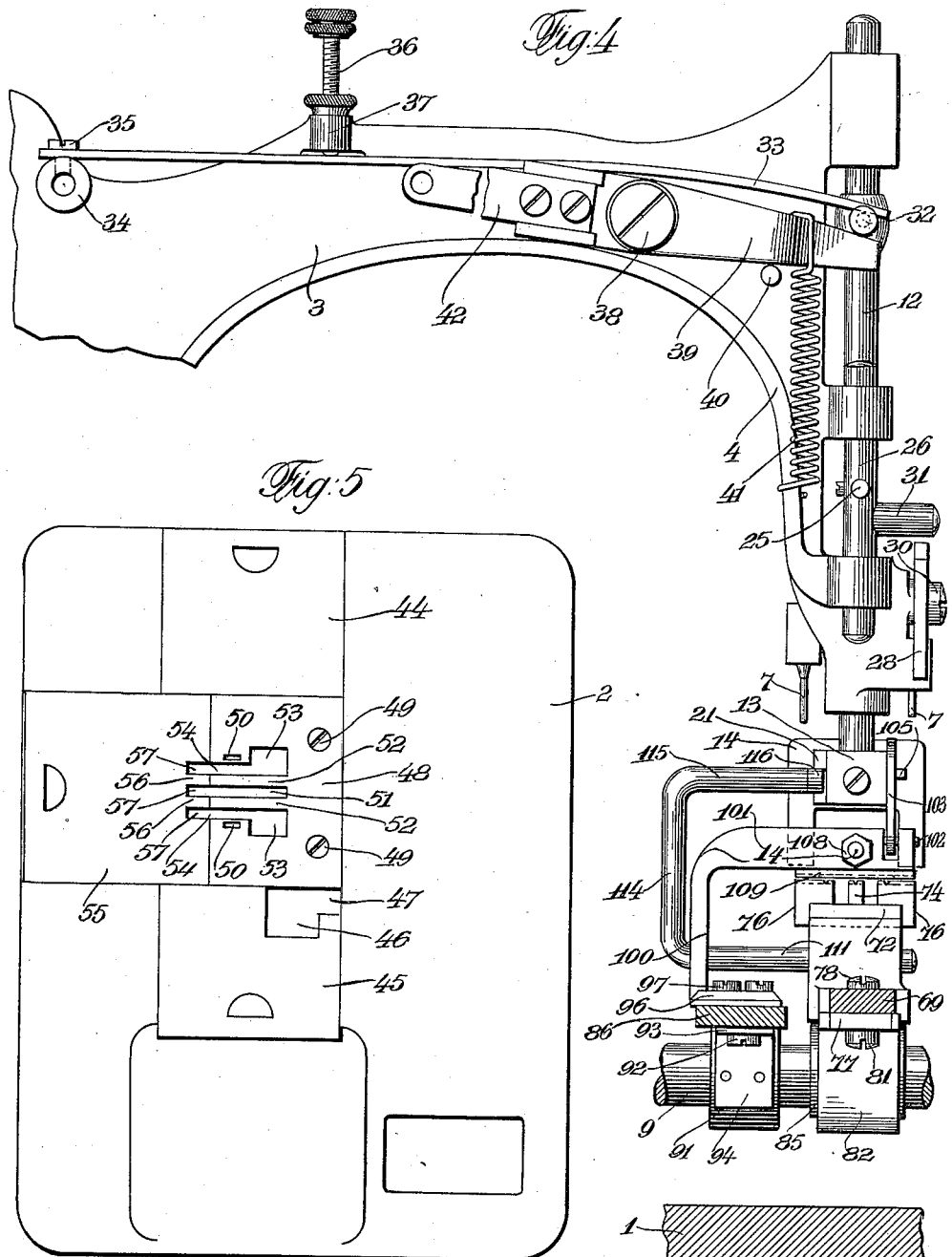

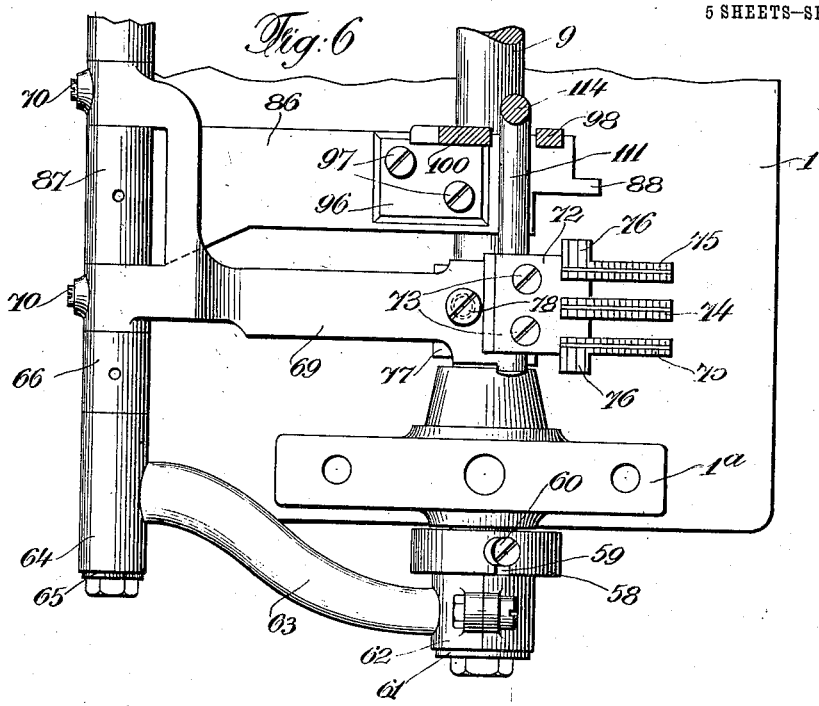

UNITED STATES PATENT OFFICE.

JOSEPH J. M. CHAUVET AND JAMES T. DOWDALL, OF NEW YORK, N. Y.; SAID DOWDALL ASSIGNOR TO JOHN W. COULTER, OF NEW YORK, N. Y.

AUTOMATIC CLAMP FEEDER AND RELEASER.

1,006,827.      Specification of Letters Patent.      Patented Oct. 24, 1911.

Application filed November 6, 1906. Serial No. 342,306.

*To all whom it may concern:*

Be it known that we, JOSEPH J. M. CHAUVET and JAMES T. DOWDALL, both citizens of the United States, residing, respectively, in the city of New York, county of New York, and State of New York, have invented a new and useful Improvement in Automatic Clamp Feeders and Releasers, of which the following is a description.

This invention relates to sewing machines and has special reference to mechanism for manipulating the work to feed the same through the machine, and for controlling said work at and around the stitching point.

Among the objects of our invention, may be noted the following: to provide a feeding mechanism by means of which the work may be advanced through the machine step by step without drag or retardation and irrespective of its width or the number of lines of stitching placed therein; to provide a feeding mechanism comprising lower and upper feed devices reciprocated simultaneously from the same train of driving mechanism and operated so as to engage the work at the end of one of its movements and release the work at the end of another of its movements, without drag or clinging to the work and by simple, angular movements; to provide a feeding mechanism comprising a clamp-feed so constructed and coöperating with the presser-foot that the latter will be lifted at the time the feeding mechanism is advancing the work and will be depressed into engagement with the work at the time of the release of the latter by the feeding mechanism; to provide a combination of mechanism comprising the feed and presser-foot, wherein, though the foot coöperates with the work, it has no engagement with the feeding mechanism, nor coöperative action therewith to feed the work; to provide a combined presser-foot and feeding mechanism wherein the presser-foot may be lifted at will from the work without disturbing the feeding mechanism and whereby also both the presser-foot and upper member of the feeding device may be lifted simultaneously to entirely release the work; and to provide combined presser-foot and feeding mechanisms intimately related and compactly associated in suchwise that the feed has entire control of the work during the feeding movement to the exclusion of the presser-foot, while the presser-foot has entire control of the work at other times to the exclusion of the feeding mechanism, the parts being arranged so as to secure all movements by short and direct connections with the driving-shaft.

With the above objects in view, and others which will be detailed during the course of this description, our invention consists in the parts, features and combinations of elements and mechanisms hereinafter described and claimed.

In order that our invention may be clearly understood, drawings have been made a part of this description, in which:

Figure 1 is a front elevation of so much of a two-needle sewing machine as is deemed necessary to illustrate our invention, the latter being shown partly in elevation and partly in section and the cloth-plate of the machine being likewise shown partly in elevation and partly in section; Fig. 2 is a view showing in elevation the left end of the machine, with the cloth-plate, main-shaft and a portion of the bed-plate in section; Fig. 3 is a vertical section of the machine taken just to the right of the top-feed-lifting eccentric and showing the cloth and bed plates, main-shaft and other portions in section; Fig. 4 is a rear elevation of a portion of the machine disclosing the presser-foot and top-feed-elevating devices, together with other details of the feeding mechanism, parts being in section; Fig. 5 is a top plan view of the cloth-plate; Fig. 6 is a top plan of that portion of the feeding mechanism which is located below the cloth-plate, the latter being removed and certain parts being shown in section; Fig. 7 is a partial elevation and vertical section illustrating a portion of the feeding mechanism and presser-foot; Fig. 8 is a front elevation of a portion of the feeding and of the presser-foot mechanisms, illustrating the connection between the two mechanisms; and Fig. 9 is a top plan view of the presser-foot.

Primarily, it should be understood that, though our invention is shown in connection with a machine wherein two lines of stitching are made, hence employing two needles and complemental stitch-forming mechanism whereby two distinct lines of stitching are produced, whether lock or chain, our invention is not limited in its application to this type of machine, as it is obvious that, with slight modifications within the knowledge of those skilled in the art, one needle and complemental stitch-forming mechanism, or more than two needles with complemental stitch-forming mechanisms, may be employed; that is to say, the nature of our invention is such as to place no limitation upon the stitch-forming mechanism either with reference to the character of stitch made or the number of individual lines of stitching which may be placed in the work during its progress through the machine under the control of our feeding and presser-foot mechanisms.

Referring to the drawings, the numeral 1 indicates the bed-plate of the machine, 2 the cloth-plate, 3 the overhanging arm, 4 the head, 5 the needle-bar, guided in bearings in said head, which carries at its lower end the needle-clamp 6 in which are secured one or more needles 7. The needle-operating lever 8, which is ordinarily actuated by a pitman jointed to its rear end and having a strap at its lower end encircling an eccentric carried by the driving-shaft 9, is connected with the needle-bar 5 by means of a link 10 pivotally connected to said lever and to a head 11 secured to the needle-bar. The presser-bar 12 is likewise journaled so as to be moved vertically in the head 4 of the machine and is located just behind the needle-bar, said presser-bar carrying at its lower end the angular head 13 on which is loosely supported the shank 14 of the presser-foot, the latter consisting of two separated depending side-portions 15 carrying at their lower ends the horizontal work-engaging or foot portions 16, each of which is provided with a needle aperture 17 and the front ends of which are upturned as at 18 and the outer ends of said upturned portions being connected by transverse bars 19 and 20, which form between them a guide-way for strips of material, the character of which will be presently described. The shank of the presser-foot is provided with an aperture $14^a$ slightly larger than the shank of screw $14^x$, which latter is tapped into the head 13 so as to properly support the presser-foot. This construction enables the foot to swing on its supporting screw $14^x$ so as to yield or give on both sides of its support in order to compensate for variations in the thickness of the work on one side or the other of the central line of feed. This variation, coupled with the vertical yield of the foot as a whole through its bar, and in opposition to the spring 33, gives to the foot great flexibility and enables it to respond quickly and easily to any differences between thicknesses on opposite sides of the central line of feed, as well as changes in the thickness of the body of the work passing under the foot as a whole. While this function of the foot is desirable, it must be accomplished within certain limits, because, if the foot be permitted to swing on its support too much, there will be danger of the needle striking the horizontal portion 16 of the foot to the injury of both and probable breaking of the needle. Hence, to limit the movement of the foot on its support, a pin $13^a$ projects from the front of head 13 into a short slot $15^a$ in the shank 15 of the foot,—see Figs. 1 and 8,—said slot being made substantially concentric with the axis of screw $14^x$. Thus, while the foot may swing freely on its support for the purposes stated, its swinging movement is limited by the pin and slot connection between the head and foot to avoid damage to and breaking of parts. The head 13 is provided on its inner or right-hand side with an angular adjusting-plate, the top horizontal portion of which is indicated at 21 and the vertical portion 22 of which is provided with a longitudinal slot 23 through which passes a screw 24 tapped into the said head 13. By this means the said plate is clamped in position and rendered vertically adjustable and affords a lifting device for the presser-foot, the extent of which lifting movement may be regulated, as will be presently described.

In order that the movements of the presser-bar may be steady and no circular movement may be imparted to it in its bearings in the head, a horizontal pin 25 is extended therefrom toward the rear and passes through a vertical bar 26, which may freely slide in opposite bearings 27 of the head. An ordinary presser-foot-lifting lever 28, having a cam-head 29, is pivoted to the head of the machine at 30 and engages a stud or pin 31 extending laterally from the presser-bar, whereby the latter may be lifted by the cam-head of the lever at will, thus raising the presser-foot from the cloth-plate of the machine independently of the feeding devices. Near its upper end the presser-bar 12 has secured thereto a pin or bar 32, upon which bears the outer end of a leaf-spring 33 secured at its rear end to a projection 34, as by a screw or pin 35 passing through said spring into the said projection. Between its ends the spring is engaged by the adjusting-screw 36, the lower end of which passes through the lug 37 of the frame and impinges against said spring so as to give more or less tension thereto and create more or less pressure upon the presser-bar through the medium of the pin 32. Journaled on the screw or pin 38, which is tapped into the arm 3 of the machine, is the lever, the forward end 39 of which extends beneath the pin 32 and normally rests upon the stop-pin 40 projecting from the head 4 of the machine, because of the tension of the spring 41, the upper end of which is hooked over the arm 39 of the lever and the lower end of which is hooked into the head 4 of the machine. The rear arm 42 of the lever is bent or extended away from the arm of the machine toward the rear and is provided with an aperture 43 for engagement with a chain, rod or other similar device which may be connected with a knee-shift or foot-treadle below the cloth-plate of the machine for the purpose of manipulating the lever and causing its arm 39 to engage the pin 32 and lift the presser-bar against the tension of the spring 33. This lever may also, obviously, be actuated by the hand.

The cloth-plate 2 is provided with an end slide-plate 44 and an inner slide-plate 45 provided with the angular slot 46 having the open end 47. The cloth-plate has also the throat-plate 48 secured thereto by means of screws 49, said throat-plate having the needle apertures 50 and a slot 51, open at one end, formed between the two tongues 52, and open-end slots on opposite sides of said tongues 52, the rear ends of which are enlarged as at 53 and extend laterally behind the needle apertures 50, and the narrow portions 54 of which extend beside the needle apertures 50 and are open at their forward ends. This construction produces a solid portion of the throat-plate around the needle apertures for coöperation of the horizontal portion 16 of the presser-foot. The front slide-plate 55 coöperates with the throat-plate 48 and is provided with the short tongues 56, which abut against the tongues 52 of the throat-plate, and is provided with slots 57 between and on opposite sides of said tongues, which continue the slots 51 and 54 in the throat-plate. Thus, provision is made for the movement of the feed-dog from below and through the cloth-plate and the latter is provided with supports for the work at all points around and between the several portions of said feed-dog.

The main-shaft 9 is, at its front end, journaled in the standard 1ª of the bed-plate and at its forward end beyond said standard is provided with the disk 58 having the diametric slot 59 in which is adjustable, by means of a screw 60, a crank-pin 61 surrounded by a strap 62 formed on the end of pitman 63 journaled by its sleeve 64 to the shaft 65 of the feed-rocking frame 66, fixed at its lower end to the shaft 67 journaled in brackets 68 of the bed of the machine. Fixed to the shaft 65 is the feed-bar 69, the rear end of which is made in the form of a yoke the arms of which receive the shaft 65 and are secured to the latter by means of the screws 70. The forward end of the feed-bars 69 is provided with the head 71, which has secured to its upper surface the shank 72 of the feed-dog, by means of the screws 73, said dog comprising the middle dog-section 74 and the end dog-sections 75 which parallel the middle dog-section, and each of which has the enlarged lateral ex- tension 76, this form of the feed-dog, obviously, corresponding to the form of the slots in the throat and front plates of the cloth-plate. The forward end of the feed-bar 69 is also provided with the friction-receiving plate 77, which is adjustably secured to the under side thereof by means of the screw 78 passing through the slot 79 and tapped into said plate 77. The feed-bar 69 is also provided on its under side with an angular bracket, the shank-portion 80 of which is secured by means of screws 81 to the under side of the feed-bar and the vertical portion 82 of which carries a sponge or pad 83 for absorbing and applying lubricant, and the horizontal portion 84 of which extends under the driving-shaft 9. In this manner the eccentric 85, carried by the main-shaft, is embraced by the horizontal portion 84 of the bracket and the bearing-plate 77 and wipes against the lubricator 83, as clearly shown in Fig. 2. As will be readily understood, the eccentric 85 gives the vertical rise and fall to the feed-bar and its dog, both of which movements are positive, while the crank-disk 58, through the connections described, gives the longitudinal reciprocations to the feeder-bar and dog, which are also positive, and the said eccentric and crank are so timed, or relatively disposed, as to cause the rise and fall and longitudinal motions to be given so that the dog will move forward below the cloth-plate, and at the end of its forward movement will rise into engagement with the work and then feed the same across the cloth-plate, and then disengage the work, these four motions being separate and distinct and in the succession noted. The adjustment of the crank-pin regulates the feed movement or stroke. The rocking-frame also has journaled to its top or upon the shaft 65 the top feed-bar 86 by means of its outer sleeved end 87, and the extreme forward end of which is provided with the reduced extension 88 upon which is hooked the upper end of the coiled-spring 89, the lower end of which is looped into a stud or bracket 90 in the top of the bed-plate 1. In this manner, the bar 86 is held in engagement with eccentric 91, which is secured to the driving-shaft 9 at a short distance from the eccentric 85. The bar 86 has secured to its under side, by means of the screws 92, a plate 93, a depending portion 94 of which carries a lubricating device 95, similar to the one 83, against which the eccentric 91 wipes, as will be clearly seen on reference to Fig. 3.

The forward end of the top feed-bar 86 carries an angular feed-arm, the horizontal base-portion 96 of which is secured by means of screws 97 to the top of said bar 86 and a side extension 98 of which is secured by means of a screw 99 to the side of said bar 86 near its extreme forward end. The feed-arm has extending from its base the vertical portion 100, which is continued into a horizontal portion 101, the free end of which is bifurcated so as to provide opposite journal bearings for a pin 102, which supports a link 103, provided with a longitudinal slot 104, in which operates a pin 105 extending from the outer side of the angular head 13 of the presser-bar. The horizontal portion 101 of the feed-arm has secured to it the upper feed-foot, the shank of which is indicated at 106 secured to said portion by means of a screw 107 passing through said shank and tapped into said portion 101, or securely held thereto by means of a nut 108. The feed-foot is provided with the horizontal portion 109 which may be and is, preferably, serrated on its bottom surface, and coöperates with the elongated portions of the several feed-dogs, and is also provided with the lateral, short extensions 110, which may be and are also preferably serrated and coöperate with the lateral extensions 76 of the feed-dogs 75. Thus, it will be seen that the upper feed-foot, together with the elongated portions of the lower feed-dog, operate between the two needles and between the two foot-portions 16 of the presser-foot, while the lateral extensions 110 of the feed-foot and the lateral extensions 76 of the feed-dog operate in rear of the two needles and in rear of the said horizontal portions 16 of the presser-foot, the latter, as well as the throat-plate, being apertured for passage of the needles. Hence, the presser-foot coöperates with the cloth-plate around the needle apertures to clamp the work in alternation with the feed of the same, but does not coöperate with the lower feed-dog in the manner usual to sewing machines and as an opposing member which enables the lower feed-dog to advance the work under, and in engagement with, the foot. The eccentrics 85 and 91 are arranged on the shaft so, or their relative timing is such, as to cause the lower feed-dog to rise as the upper feed-foot descends, and vice versa, the spring 89 aiding in the descent of the upper feed-foot, but exerting a yielding pressure upon said foot for its coöperation with the feed-dog. Secured in the head 71 of the feed-bar 69 is a U-shaped connection between the said feed-bar and the presser-bar, the lower arm 111, which is the longer, being adjustably secured, longitudinally and axially, in a transverse bore of the head 71 by means of the set-screw 112 tapped through said head and which engages said arm 111 in the bore of the head. The said horizontal arm 111 extends through a slot 113 in the vertical portion 100 of the feed-arm, and is then bent vertically, as at 114, which vertical portion extends up through the inner slide-plate 45 of the cloth-plate and operates in the large portion 46 of the slot thereof, and is then bent to provide the overhanging bar 115, which parallels the arm 111 and extends into coöperation with the horizontal portion 21 of the adjustable angle-plate secured to the head 13 of the presser-bar. This coöperation of the rigid connection between the presser-bar and the feed-bar is loose and sliding and the outer end of the bar 115 is provided with the anti-friction roll 116, in order that there may be as little friction as possible between said arm and the angle-plate, the action of said connection upon the presser-bar being, however, positive and the connection between said bar 115 and the presser-bar being adjustable, as already described, by shifting the position of the angle-plate, so as to make the lift of the presser-foot more or less as may be desired according to the thickness of the work thereunder, and in order to produce the proper coöperation of said arm with the presser-bar, irrespective of the thickness of the work passing under the foot, or by means of the screw 112 in order to set the bar 115 for proper coöperation with said angle-plate.

Having described the details of construction of our feeding mechanism, the operation and functions of the machine only remain to be set forth. The rotation of the driving-shaft 9 will cause the crank, on its forward end, to actuate the feed-rocker 66, the movement of which will be imparted to the two feed-bars 69 and 86, this motion imparting the longitudinal reciprocation to the feed-foot and feed-dog in unison to carry the work across the cloth-plate. The two eccentrics 85 and 91 will impart to said feed-bars their rise and fall in alternation, the feed-bar 86 rising as the feed-bar 69 falls, and vice versa, this action of the two bars causing the lower feed-dog and upper feed-foot to approach each other to clamp the work and separate from each other to release the work after the two together have fed the work across the cloth-plate and under the raised presser-foot. The vertical rise and fall of the main feed-bar will be transmitted to the presser-foot through the U-shaped connection 111—114—115, this connection itself being rigid and imparting positive lifting motion to the presser-foot, while the return motion of said foot will be under pressure of its spring 33, which will be yielding. Hence, as the lower feed-dog rises, the presser-foot also rises, the upper feed-foot falling at the same time to grip the work against the lower feed-dog; and the presser-foot will be held in its extreme upper position free from the work during the entire feeding movement of the clamp-feed, because of the maintenance of the loose and sliding connection between the upper bar 115 and the angle-plate 21 secured to the presser-bar head, the presser-foot descending as the clamping-feed-parts separate and thus taking control of the work by clamping the same tightly between it and the throat-plate. Thus, the clamp-feed alternates with the presser-foot in its grip upon or engagement with the work, the said foot and clamp-feed, in consequence, alternately assuming control of the work. As the clamp-feed engages the work over a considerable area, it will be readily understood that the work will be positively and uniformly fed across the cloth-plate without any turning or twisting tendency and more especially as the clamp-feed is the only part of the feeding mechanism which has engagement with or controls the said work at that time. However, upon the instant that the clamp-feed releases the work, the presser-foot engages the same and presses it firmly against the cloth-plate, thus preventing either of the feeding devices from having any effect on the work, or creating any drag which would either snag or distort the same. At any time, irrespective of the position of the parts of the clamp-feed, the presser-foot may be elevated through the medium of the cam-lever 28, and this without having any effect whatever upon the feeding mechanism; and, likewise, irrespective of the position of either the clamp-feed-parts, or of the presser-foot, the upper feed-foot and the presser-foot may be elevated from contact with the work by manipulating the lever 42 through the medium of either the hand or a knee-shift or treadle mechanism connected with said lever, as described. Hence, at any time during the operation of the machine, or while it is quiescent, and irrespective of the position of the parts, the presser-foot may be elevated independently of the feeding mechanism by either the cam-lever 28, or the lever 42, and the top-feed member may be lifted simultaneously with the lifting of the presser-foot, through the medium of the lever 42 and connections 102, 103 and 105, previously described, thus enabling the operator to stop the feeding of the goods, examine the work, or adjust the latter, as may be needful.

The machine may accomplish many different kinds of work, that is, a binding may be applied, top and bottom, to a single piece of work by simply leading in the body-material under one or both needles and simultaneously therewith leading a binding-strip from above the work between the guide-bars 19 and 20 of the presser-foot and another one over the surface of the cloth-plate under the body-material. Accordingly as the body-material is extended only beyond the left-hand needle or beyond the right-hand needle, the binding strips will be sewed to said body-material by one or two lines of stitching in the machine illustrated in the drawings. Another product of the machine is a stay-band or strip, the edges of which may be first turned or hemmed and then led through the guide of the presser-foot, either in one or two thicknesses, or one strip may be led through the guide of the presser-foot, while the other is led under the presser-foot across the cloth-plate of the machine. Accordingly as one or more needles are employed, the results or products of the machine will vary.

Having thus described our invention, what we claim and desire to secure by Letters Patent is:

1. In combination, in a feeding mechanism, a work-plate; a lower feed-device; an upper feed-device; means for actuating said devices to cause them to clamp and feed the work; a presser-foot coöperating with the work-plate; and means actuated by the lower feed-device for raising the presser-foot from the work when the feed of the latter occurs.

2. In combination, in a feeding mechanism, a work-plate; a clamp-feed; a presser-foot coöperating with the work-plate; means for actuating the clamp-feed to feed the work; and means actuated by the clamp-feed for raising and for holding the presser-foot from the work when the feed of the latter occurs.

3. In combination in a feeding mechanism, a work-plate; a four-motion feed-bar carrying a feed-dog; a second bar carrying a feed-foot coöperating with said dog; means for actuating the dog and foot to feed the work; a presser-foot coöperating with the work-plate; and a connection for operating said presser-foot and actuated by said four-motion feed-bar whereby, as the feed of the work occurs, the presser-foot will be lifted therefrom.

4. In combination, in a feeding mechanism, a work-plate; a driving-shaft; a plurality of feed-bars arranged below the work-plate; eccentrics carried by said shaft for raising and lowering said bars; feeding devices carried by said bars; means for actuating the bars to feed the work; a presser-foot coöperating with said work-plate; and actuating means connecting one of said bars with said foot whereby the latter may be lifted from the work as the feed of the latter occurs.

5. In combination, in a feeding mechanism, two bars arranged in parallelism; a driving-shaft; eccentrics carried by the shaft and coöperating, respectively, with said bars whereby the same may be given rising and falling motions; means for longitudinally reciprocating said bars; a feed-dog carried by one of said bars; a feed-arm carried by the other of said bars, having a foot which overhangs and coöperates with the feed-dog; a presser-foot; and mechanism for actuating the same from the feeding mechanism so that when the latter engages the work the presser-foot will disengage the work.

6. A feeding mechanism comprising a feed-bar carrying a dog; a second bar arranged in parallelism with said feed-bar and having a feed-arm supporting a foot overhanging the dog; a driving-shaft carrying two eccentrics and a crank; connections between the crank and the bars for reciprocating the latter; connections between the bars and eccentrics whereby the latter may cause the dog and foot to clamp and release the work; and means for actuating the presser-foot in alternation with the feed-dog and foot so that when the presser-foot is raised from the work the feed-dog and feed-foot will feed the work.

7. In combination, a presser-foot mechanism; a feeding mechanism; means for actuating the feeding mechanism to feed the work; means for lifting the presser-foot at the will of the operator without disturbing the feeding mechanism; and a connection between the presser-foot mechanism and feeding mechanism whereby when the foot is elevated beyond a certain point a portion of the feeding mechanism will be simultaneously elevated.

8. In combination, a feeding mechanism; a presser-foot mechanism; means for actuating the feeding mechanism to move the work; means for lifting the presser-foot at the will of the operator; and a connection between the presser-foot mechanism and feeding mechanism whereby the foot, through the medium of said lifting means, may be elevated independently of the feeding mechanism and whereby also the foot and a portion of the feeding mechanism may be elevated simultaneously.

9. In combination, a presser-foot mechanism; a feeding mechanism comprising a top-feed foot; a connection between the said presser-foot mechanism and the said feed-foot; and means coöperating with the presser-foot mechanism whereby, by a movement to a certain extent, the presser-foot may be lifted independently of the feed-foot, and whereby, by an additional movement, the feed-foot also may be elevated.

10. In combination, a presser-foot mechanism; a feeding mechanism comprising a top-feed foot; means coöperating with the presser-foot mechanism to raise and lower the presser-foot at will without disturbing the feeding mechanism; and a connection between the top-feed foot and the presser-foot mechanism whereby, through the presser-foot-lifting means, the said top-feed foot may also be lifted at the will of the operator.

11. In combination, a presser-foot mechanism comprising a bar carrying at its end a head; a presser-foot supported by said head; an angular plate carried by said head; a feeding mechanism comprising a work-engaging device; and a connection, actuated by the latter mechanism, coöperating with the angular plate of said head, whereby, as the feeding device is actuated, the presser-foot may also be actuated.

In testimony whereof we have hereunto signed our names in the presence of two subscribing witnesses.

JOSEPH J. M. CHAUVET.
JAMES T. DOWDALL.

Witnesses:
FLORENCE ATEN IVES,
CHAS. McC. CHAPMAN.

---

Copies of this patent may be obtained for five cents each, by addressing the "Commissioner of Patents, Washington, D. C."